(12) United States Patent
Kim

(10) Patent No.: US 9,300,166 B2
(45) Date of Patent: Mar. 29, 2016

(54) BATTERY MANAGEMENT SYSTEM AND DRIVING METHOD THEREOF

(71) Applicant: SAMSUNG SDI CO., LTD., Yongin-si, Gyeonggi-do (KR)

(72) Inventor: Seong-Joong Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 188 days.

(21) Appl. No.: 14/092,093

(22) Filed: Nov. 27, 2013

(65) Prior Publication Data

US 2014/0354236 A1    Dec. 4, 2014

(30) Foreign Application Priority Data

May 29, 2013 (KR) .................. 10-2013-0061091

(51) Int. Cl.
*H02J 7/00* (2006.01)
*H02J 7/04* (2006.01)
*H02J 7/02* (2006.01)

(52) U.S. Cl.
CPC ............... *H02J 7/045* (2013.01); *H02J 7/0016* (2013.01); *H02J 7/022* (2013.01)

(58) Field of Classification Search
CPC ............. H02J 7/0031; H02J 2007/004; H02J 2007/0037; Y02E 60/12; H01M 10/48

USPC .......................................................... 320/134
See application file for complete search history.

(56) References Cited

U.S. PATENT DOCUMENTS

| | | | |
|---|---|---|---|
| 8,134,340 B2 | 3/2012 | Park | |
| 2005/0242667 A1* | 11/2005 | Emori et al. | 307/10.1 |
| 2006/0132089 A1* | 6/2006 | Ambrosio et al. | 320/107 |
| 2011/0161024 A1* | 6/2011 | Sim et al. | 702/63 |
| 2012/0194004 A1 | 8/2012 | Lim | |

FOREIGN PATENT DOCUMENTS

| | | |
|---|---|---|
| KR | 2006-0102667 A | 9/2006 |
| KR | 10-2011-0021397 | 3/2011 |
| KR | 10-1219240 | 12/2012 |

* cited by examiner

*Primary Examiner* — Arun Williams
(74) *Attorney, Agent, or Firm* — Lee & Morse, P.C.

(57) ABSTRACT

A battery management system (BMS) includes a first switch, a master BMS, and a slave BMS. The first switch is coupled to a charging and discharging path of a battery pack, which includes at least one battery cell. The master BMS is electrically coupled to the first switch to control operation of the first switch. The slave BMS obtains information of the battery pack, determines a status of the battery pack based on the information, and controls operation of the first switch based on the status of the battery pack.

17 Claims, 4 Drawing Sheets

BATTERY MANAGEMENT SYSTEM AND DRIVING METHOD THEREOF

CROSS-REFERENCE TO RELATED APPLICATION

Korean Patent Application No. 10-2013-0061091, filed on May 29, 2013, and entitled "Battery Management System and Driving Method Thereof," is incorporated by reference herein in its entirety.

BACKGROUND

1. Field

One or more embodiments described herein to a battery management system.

2. Description of the Related Art

Systems which store electric power and which efficiently utilize the stored electric power is in continual demand. One type of power storage system stores power from a new renewable energy source in a battery, or stores common grid power in a battery in connection with a common grid. The power storage system may supply the electric power stored in the battery to the common grid or a load.

Such systems may use a rechargeable battery as a secondary battery. One type of rechargeable battery includes several battery cells coupled in series or parallel in a single package.

In order to manage charging and discharging operations of the rechargeable battery, a battery management system (BMS) may be used. One type of battery management system includes a slave BMS which controls a status of each battery cell and a master BMS which controls slave BMS and the entire battery management system. When an error occurs in the master BMS, the slave BMS may be used to safely manage the battery. While the use of a slave BMS is useful in certain circumstances, there are still many drawbacks to battery management systems to be addressed.

SUMMARY

In accordance with one embodiment, a battery management system (BMS) includes a first switch coupled to a charging and discharging path of a battery pack, the battery pack including at least one battery cell; a master BMS electrically coupled to the first switch to control operation of the first switch; and a slave BMS to obtain information of the battery pack, determine a status of the battery pack based on the information, and control operation of the first switch based on the status of the battery pack. The slave BMS may control the operation of the first switch when an abnormality exists corresponding to the master BMS.

Also, the first switch includes a relay coupled to the charging and discharging path and a coil to drive the relay in accordance with a current applied from the master BMS. The slave BMS may control operation of a second switch coupled to a first path where the current is applied to the relay. The second switch may include a sub-relay coupled to the first path and a sub-coil to drive the sub-relay in accordance with the current applied from the slave BMS. If an abnormality exists in the battery pack, the slave BMS may reduce the current applied to the sub-coil to open the sub-relay.

Also, the information of the battery pack may include at least one of a voltage value of the at least one battery cell, a current value which flows in the at least one battery cell, or a temperature value of the at least one battery cell. If any one of the voltage value, the current value, or the temperature value is out of a predetermined range, the slave BMS may open the first switch.

In accordance with another embodiment, a battery management system (BMS) includes a master BMS coupled to a plurality of battery packs; a plurality of slave BMSs coupled to respective ones of the plurality of battery packs, wherein: the master BMS controls charging or discharging of the battery packs under a first condition, and at least one slave BMS controls charging or discharging of one or more of the battery packs under a second condition different from the first condition, wherein the second condition is an error condition.

Also, the master BSM and the slave BMSs may be powered independently from charge stored in the battery packs. The error condition may relate to an operation corresponding to the master BMS.

Also, the at least one slave BMS may terminate charging or discharging of one or more battery packs when the one or more battery packs is operating in an abnormal state. The abnormal state may correspond to when a parameter of the one or more battery packs lies outside a predetermined range.

In accordance with another embodiment, a driving method of a battery management system includes measuring information of a battery pack which includes at least one battery cell; transmitting the measured information to a master BMS which generates a signal to control operation of the battery pack; determining a status of the battery pack based on the information; and controlling operation of the first switch which is coupled to a charging and discharging path of the battery pack and which is electrically connected to the master BMS, wherein controlling operation of the first switch is performed based on the status of the battery pack.

Also, the method may include controlling operation of the first switch by a slave BMS when an abnormality exists corresponding to the master BMS. The first switch may include a relay coupled to the charging and discharging path and a coil to drive the relay in accordance with a current applied from the master BMS, the method further comprising: controlling operation of a second switch coupled to a first path in which the current is applied from the master BMS to drive the relay.

Also, a second switch includes a sub-relay coupled to the first path and a sub-coil to drive the sub-relay, the method further comprising: controlling an amount of current applied to the sub-coil based on the status of the battery pack.

Also, then method may include, reducing an amount of current applied to the sub-coil to open the sub-relay when an abnormality exists in the battery pack.

Also, the information of the battery pack may include at least one of a voltage value of the at least one battery cell, a current value which flows in the at least one battery cell, or a temperature value of the at least one battery cell. The method may further include opening the first switch when any one of the voltage value, the current value, and the temperature value is out of a predetermined range.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
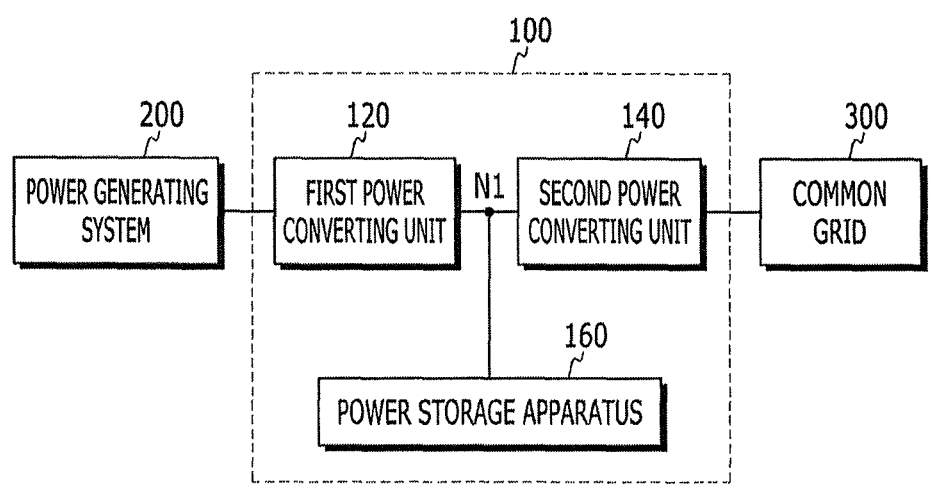
FIG. 1 illustrates an embodiment of a power storage system.

Example embodiments will be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of a power storage system 100 connected between a power generating system 200 and a common grid 300. The power generating system 200 may include a system which generates electrical energy from a renewable energy source such as sunlight, wind, wave, tides, or geothermal heat. Alternatively, the power generating system 200 may include another common grid or another type of source from which power may be received.

The common grid 300 may include a power plant which generates electric power through thermal power generation, hydroelectric power generation, or nuclear power generation, a substation, and/or a power transmission station which change a property of a voltage or a current in order to send the generated electric power through a transmission line or a distribution line.

Even though the power storage system 100 shown in FIG. 1 is connected to the common grid 300, in alternative embodiments the common grid 300 may be substituted with a load. A load, for example, may correspond to various types of electric equipment which consume electric power, including but not limited to home or consumer electronics or production facilities of a factory.

In the illustrated embodiment, the power storage system 100 includes a first power converting unit 120, a second power converting unit 140, and a power storage apparatus 160.

The first power converting unit 120 is connected to the power generating system 200 and converts a first electric power generated in the power generating system 200 into a second electric power to transmit the second electric power to a node N1. The first electric power, for example, may be DC power or AC power, and electric power at the node N1 may be DC power. In one embodiment, the first power converting unit 120 may be a DC-DC converter which converts the first DC power into DC power of another level, or an AC-DC converter which converts first AC power into a DC power.

The second power converting unit 140 is connected between the node N1 and the common grid 300. The second power converting unit 140 converts the DC power of the node N1 into the AC power to transmit the AC power to the common grid 300. That is, the second power converting unit may be a DC-AC converter which converts the DC power into the AC power.

The power storage apparatus 160 stores the DC power of node N1. The power storage apparatus 160 may supply the stored DC power to the node N1 again at the time of a blackout or at another predetermined time or in response to a control signal. For example, at the time of a blackout, the DC power supplied from the power storage apparatus 160 to node N1 is converted by the second power converting unit 140 and transmitted to the common grid 300 or a load. Therefore, at the time of a blackout, the electric power may always be safely supplied to the common grid 300 or the load.

As indicated, the power storage apparatus 160 may supply the DC power supplied to node N1 at times other than at blackout. In this case, the electric power which is supplied from the power generating system 200 may be transmitted to the common grid 300 or the load through the power storage apparatus 160 at these times.

Figure 2:
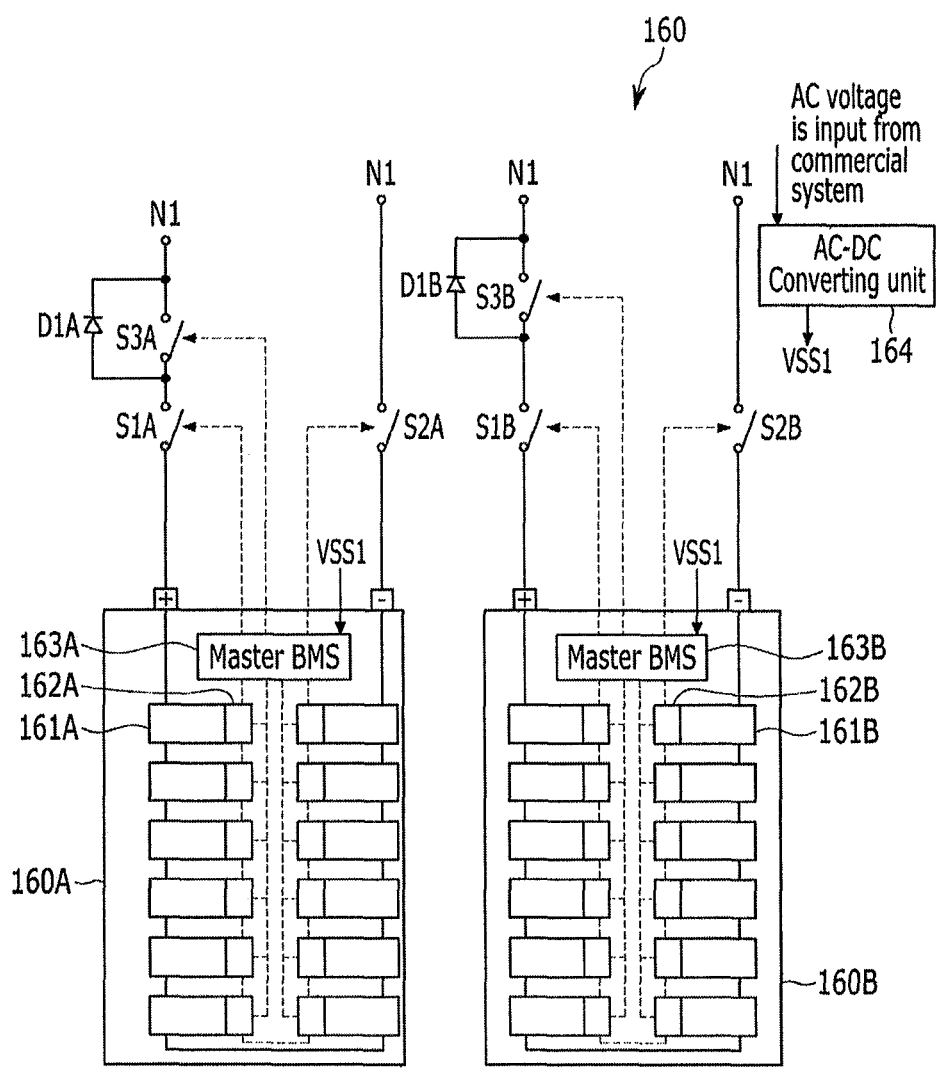
FIG. 2 illustrates an example of an internal configuration of a power storage apparatus.

FIG. 2 illustrates a first embodiment of an internal configuration of the power storage apparatus 160. As illustrated in FIG. 2, the power storage apparatus 160 includes a plurality of battery racks 160A and 160B, an AC-DC converting unit 164, a plurality of main switches S1A, S1B, S2A, and S2B, a plurality of charging switches S3A and S3B, and diodes D1A and D1B. In FIG. 2, flows of the voltage and the current are represented by a solid line and flows of a measurement signal and a switching control signal of the battery management system are represented by dotted lines.

The first battery rack 160A includes a plurality of battery packs 161A, a plurality of slave battery management systems 162A ("slave BMSs"), and a master battery management system 163A ("master BMS").

The plurality of battery packs 161A may be coupled in series to a positive potential output terminal (+) and a negative potential output terminal (−) of the battery rack 160A. Power lines are connected to the positive potential output terminal (+) and the negative potential output terminal (−), respectively. That is, the plurality of battery packs 161A coupled in series outputs the electric power to the power lines through the positive potential output terminal (+) and the negative potential output terminal (−).

Each battery pack 161A includes a plurality of cells coupled in series or in parallel. The cells may correspond to a rechargeable battery which is capable of being charged and discharged. Examples include but are not limited to a nickel-cadmium battery, a lead storage battery, a nickel-hydrogen battery, a lithium-ion battery, or a lithium polymer battery.

Each of the plurality of slaves BMS 162A manages charge and discharge of an associated one of the battery packs 161A. The master BMS 163A manages charge and discharge of all of the battery packs 161 in the battery rack 160A. Also, in FIG. 2, each battery pack 161A is shown to include or be coupled to a slave BMS 162A. However, the slave BMSs 162A may manage the charging and discharging of the plurality of battery packs 161A.

In one embodiment, the slave BMS 162A may obtain, e.g., measure a voltage, a current, and/or a temperature of each cell included in an associated one of the battery packs 161A. The slave BMS 162A may then transmit information indicative of the measured voltage, the current, and/or temperature to the master BMS 163A. The master BMS 163A uses this information of each cell or pack, transmitted from each slave BMS 162A, to estimate a state of charge (SOC) or a state of health (SOH) of the cell or the battery pack 161A, and accordingly to control the entire battery racks 160A to be charged or discharged.

The slave BMS 162A may obtain, e.g., measure the voltage, the current, and the temperature of each cell to estimate the state of charge and the state of health of the cells in an associated pack and to transmit the estimated state of charge and state of health of the cells/pack together with information indicative of the voltage, the current, and/or the temperature of the cells/pack to the master BMS 163A. The master BMS 163A uses the state of charge and the state of health of the cell which are transmitted from the slave BMS 162A to control charging and/or discharging of the packs in the entire battery rack 160A.

The master BMS 163A uses the information indicative of the voltage, the current, and/or the temperature of the cells/pack transmitted from each slave BMS 162A to detect whether an abnormality of the voltage and/or current of each battery pack 161A exists, and/or whether an abnormality exists in the entire battery rack 160A. If an abnormality of the battery pack 161A or the battery rack 160A is detected, the master BMS 163A may, for example, transmit a switching control signal to the main switches S1A and S2A to cut off the main switches S1A and S2A to protect the battery.

The master BMS 163A generates another switching control signal to control the on/off state of a charging switch S3. In one embodiment, the master BMS 163A turns on the switch S3A in order to charge the battery rack 160A. When the charging operation is completed, the master BMS 163A may turn off the switch S3A.

If the battery protecting function of the master BMS 163A cannot be performed or is not performed (because, for example, of an error condition of the master BMS), any one of the plurality of slave BMS 162A may perform a role of the master BMS 163A. For example, a default or predetermined one of the slave BMSs 162A may be used in this case. This predetermined or default slave BMS 162A may detect the abnormality of the voltage and/or the current of an associated battery pack and/or the entire battery rack 160A and then control operation of the main switches S1A and S2A, which will be described below with reference to FIG. 3.

Similar to the first battery rack 160A, the second battery rack 160B includes a plurality of battery packs 161B, a plurality of slave BMS 162B, and a master BMS 163B. An internal configuration and the functions of the components of the second battery rack 160B may be the same or similar to those of the first battery rack 160A.

The AC-DC converting unit 164 receives the AC voltage from the common grid, converts the received AC voltage into a DC voltage Vss, and transmits the converted DC voltage Vss to the master BMS 163A and the master BMS 163B. The DC voltage Vss output from the AC-DC converting unit 164 may be used as operating power required to operate the master BMS 163A and the master BMS 163B. Thus, the BMS 163A and BMS 163B may be powered independently from the power stored in power storage apparatus 160, so as to ensure proper operation, for example, during a blackout. The slave BMSs may also be independently powered. The DC voltage Vss may be transmitted to the slave BMS 162A and 162B to be used as an operating power required to operate the slave BMS 162A and 162B.

One end of the main switch S1A is connected to the positive potential output terminal (+) of the first battery rack 160A. One end of the charging switch S3A may be connected to the other end of the main switch S1A and the other end of the charging switch S3A may be connected to the node N1. An anode of the diode D1A may be connected to one end of the charging switch S3A and a cathode may be connected to the other end of the charging switch S3A. The main switch S2A may be connected between the negative potential output terminal (−) of the first battery rack 160A and the node N1.

The main switches S1A and S2A may be maintained to be turned on during the charging/discharging operation, to form a charging path and a discharging path. Further, when an abnormality occurs in the first battery rack 160A, the main switches S1A and S2A may be turned off to cut off the voltage and current output from the positive potential output terminal (+) and the negative potential output terminal (−).

In the first battery rack 160A, the plurality of battery packs 161A is connected in series to output a high voltage and high current of 1 kV and 300 A, so that the main switches S1A and S2A may be implemented as a semiconductor device which may cut off the high voltage and the high current. The main switches S1A and S2A may form both the charging path and the discharging path, so that the main switches S1A and S2A may be implemented, for example, as a back-to-back switch whose drains are connected to each other.

The charging switch S3A is turned on during the charging operation of the first battery rack 160A to form the charging path. When charging is completed, the charging switch S3A may be turned off. The diode D1A may form the discharging path during the discharging operation of the first battery rack 160A.

One end of the main switch S1B may be connected to the positive potential output terminal (+) of the second battery rack 160B. One end of the charging switch S3B may be connected to the other end of the main switch S1B and the other end may be connected to the node N1. An anode of the diode D1B may be connected to one end of the charging switch S3B and a cathode may be connected to the other end of the charging switch S3B. The main switch S2B may be connected between the negative potential output terminal (−) of the second battery rack 160B and the node N1.

The main switches S1B and S2B are turned on during a charging/discharging operation, to form the charging path and the discharging path. When an abnormality occurs in the second battery rack 160B, the main switches S1B and S2B may be turned off to cut off the voltage and current output from the positive potential output terminal (+) and the negative potential output terminal (−).

Also, in the second battery rack 160B, a high voltage and high current may be output, so that the main switches S1B and S2B may be implemented as a semiconductor device which may cut off the high voltage and the high current. The main switches S1B and S2B may form both the charging path and the discharging path, so that the main switches S1B and S2B may be implemented, for example, as a back-to-back switch whose drains are connected to each other.

The charging switch S3B is turned on during the charging operation of the second battery rack 160B to form the charging path. If the charging is completed, the charging switch may be turned off. The diode D1B may form the discharging path during the discharging operation of the second battery rack 160B.

Figure 3:
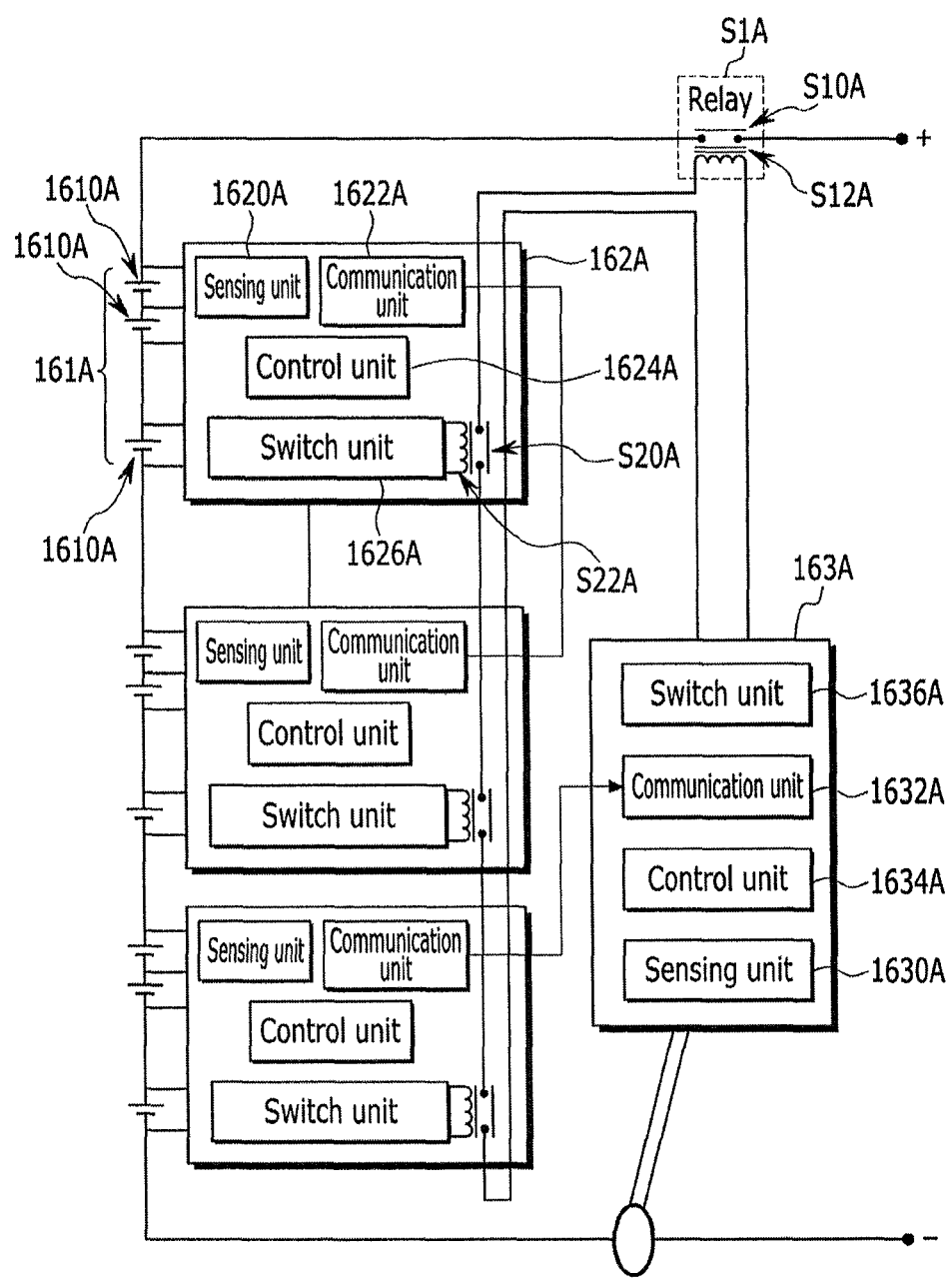
FIG. 3 illustrates an embodiment of a battery management system.

FIG. 3 illustrates an embodiment of a battery management system. In this system, the positive potential output terminal (+) and the battery pack 161 are connected by the power line. A current Icharge, which flows in the power line to charge the battery pack 161, or a current Idischarge, which discharges the power charged in the battery pack 161 to the outside, may be cut off in response to operation of the main switch S1. In at least one embodiment, a current Icharge which charges the battery pack 161 flows in the power line.

The main switch S1 may be configured by a switching element which opens a port of the power line to cut off a current which flows in the power line. It is assumed that the main switch S1 includes a relay S10 which connects the power line and the battery pack 161 and a lead line S12 which operates the relay S10. However, a circuit which allows the main switch S1 to cut off the current flowing through the power line is not limited to the above example.

The lead line S12 which operates the relay S10 may be connected to the master BMS 163. Further, operation of the relay S10 may be controlled in accordance with the current which is applied to the lead line S12. The internal configuration of the main switch S2 and the functions of the components may be the same as or similar to the main switch S1.

The master BMS 163 may include a master communication unit 1632, a master switch unit 1636, a master sensing unit 1630, and a master control unit 1634.

First, the master communication unit 1632 receives a voltage value, a current value, a temperature value, the state of charge or the state of health of each cell 1610 from the slave BMS 162, and outputs the received values to the master control unit 1634. The master communication unit 1632 may transmit a command, generated from the master control unit 1634 to control the slave BMS 162, to a communication unit 1622 of the slave BMS 162.

The master sensing unit 1630 may measure a current which flows in the power line. For example, the master sensing unit 1630 may use a resistance formed in the power line to directly measure the current which flows in the power line. As another example, the master sensing unit 1630 may use a Hall sensor to measure the current which flows in the power line. A circuit which allows the master sensing unit 1630 to measure the current which flows in the power line is not limited thereto.

The master sensing unit 1630 outputs information indicative of the measured result to the master control unit 1634. The master control unit 1634 may estimate the state of charge and the state of health of the entire cells 1610 from the voltage value, the current value, the temperature value, the state of charge or the state of health of the cell 1610 from the slave BMS 162. For example, the master control unit 1634 may include a data table which shows a relationship between an open circuit voltage OCV and a state of charge to calculate the state of charge of each cell, or pack, from data indicating the relationship between the open circuit voltage OCV and the state of charge of the detected cell or pack.

In other embodiments, a different method may be used to calculate the state of charge of the battery cells or packs, e.g., methods other than those which calculate the state of charge from an open circuit voltage OCV. An examples of a different method includes a current integral method.

Further, the master control unit 1634 may output a cell balancing signal to each slave BMS to perform a cell balancing operation. The cell balancing operation may be performed, for example, in accordance with the voltage value, the current value, and/or the temperature value of each cell or pack.

Alternatively, the master control unit 1634 may generate a signal which controls the relay S10 in accordance with the voltage value, the current value, the temperature value, the state of charge, and the state of health of each cell 1610 which are transmitted from the slave BMS 162 and the measurement result of the master sensing unit 1630 to output the signal to the master switch unit 1636.

For example, the master control unit 1634 outputs a signal which applies a current to the lead line S12 which operates the relay S10 to the master switch unit 1636. When the master switch unit 1636 applies the current to the lead line S12 which operates the relay S10, the current flows in a coil-shaped lead line S12 which approaches the relay S10 and a magnetic field is formed in the coil to operate the relay S10. The current which charges the battery pack 161 is therefore received from the positive potential output terminal (+), so that the battery pack 161 may be charged.

Each slave BMS 162 connected to each battery pack 161 may include a sensing unit 1620, a communication unit 1622, a control unit 1624, and a switch unit 1626. Alternatively, the sensing unit 1620 may be provided outside the slave BMS 162.

The sensing unit 1620 may measure a status of the battery pack 161 and the cells 1610 which are included in battery pack 161. The status may be measured, for example, based on a voltage and/or a temperature of each cell 1610, and/or a current which flows in each cell 1610. For example, the sensing unit 1620 may measure a total voltage of the battery pack 161 or an intermediate voltage, i.e., the total voltage of the entire cells or a voltage of each cell 1610. In this case, the voltage value which is measured by the sensing unit 1620 may include an open circuit voltage (OCV) of each cell 1610 and an actual measured voltage which is measured during the charging or discharging operation.

The sensing unit 1620 may be electrically connected to the node between the cells 1610, in order to measure the total voltage and the intermediate voltage of the battery pack 161. That is, at least one wiring line may be formed between the sensing unit 1620 and the cells 1610 in order to measure the intermediate voltage of the battery pack 161. The measured voltage value, current value, and/or temperature value of each cell 1610 may be output to the control unit 1624.

The control unit 1624 may transmit information indicative of the voltage value, the state of charge, the current value, and/or the temperature value of each cell 1610 to the master BMS 163 through the communication unit 1622. Further, the control unit 1624 may determine whether an abnormality occurs in the battery pack 161, or at least cell 1610 included in the battery pack 161, from the information indicative of the voltage value, the current value, and/or the temperature value of each cell 1610.

In one embodiment, the sensing unit 1620 may measure the current which flows in the at least one cell 1610 included in the battery pack 161, and output information indicative of the measured current to the control unit 1624. The control unit 1624 may compare a predetermined current reference value with the current value output from the sensing unit 1620. If the current value output from the sensing unit 1620 is equal to or higher than the predetermined current reference value (or falls within a predetermined range), the control unit 1624 determines that overcurrent condition exists (e.g., an excessive amount of current flows) in the corresponding cell 1610.

In another embodiment, the sensing unit 1620 may measure the voltage of the at least one cell 1610 included in the battery pack 161, and output information indicative of the measured voltage to the control unit 1624. The control unit 1624 may compare a predetermined voltage reference value with the voltage value output from the sensing unit 1620. If the voltage value output from the sensing unit 1620 is equal to or higher than the predetermined voltage reference value (or falls within a predetermined range), the control unit 1624 determines that overvoltage condition exists (e.g., an excessive amount of voltage occurs) in the corresponding cell 1610.

In another embodiment, the sensing unit 1620 may measure the temperature of the at least one cell 1610 included in the battery pack 161, and output information indicative of the measured temperature to the control unit 1624. The control unit 1624 may compare a predetermined temperature reference value with the temperature value output from the sensing unit 1620. If the temperature value output from the sensing unit 1620 is equal to or higher than the predetermined temperature reference value (or falls within a predetermined range), the control unit 1624 determines that the corresponding cell 1610 is physically damaged.

If the control unit 1624 determines that the abnormality occurs in each cell 1610, the control unit 1624 may control the operation of the relay S10 through the switch unit 1626. Further, the control unit 1624 may transmit information indicative of whether the abnormality of each cell 1610 occurs to the master BMS 163 through the communication unit 1622.

The switch unit 1626 may be configured by a switching element which opens the lead line S12 and which operates the relay S10 to cut off the current which flows in the lead line S12. The switch unit 1626 may include a sub relay S20 which is connected to the lead line S12 and which operates the relay S10. The switch unit 1626 which cuts off the current which flows in the lead line S12 is not limited to the above example. In one embodiment, the sub relay S20 may be operated by the current output from the switch unit 1626.

The control unit 1624 may output the signal which operates the sub relay S20 to the switch unit 1626. When the signal is received, the switch unit 1626 may output the current to the lead line S22 which operates the sub relay S20. When the current is output from the switch unit 1626, the current is applied to the coil-shaped lead line S22 which approaches the sub relay S20 and a magnetic field is formed in the coil to operate the sub relay S20.

As a result, current flows in the lead line S12 which is connected to the relay S10 and the relay S10 operates so that the current which charges the battery pack 161 is received from the power line.

Further, if it is determined that an abnormality exists in the cell 1610, the control unit 1624 may stop operation of the relay S10 through the switch unit 1626, to thereby cut off the current which flows in the power line. The control unit 1624 may output a signal which stops operation of the sub relay S20 to the switch unit 1626.

If the stopping signal is received, the switch unit 1626 may stop outputting the current to the lead line S22 which operates the sub relay S20. If the current output from the switch unit 1626 is stopped, an amount of current which flows in the coil-shaped lead line S22 which approaches the sub relay S20 is reduced so that the operation of the sub relay S20 may be stopped.

If so, the current which flows in the lead line S12 connected to the relay S10 is cut off and operation of the relay S10 is stopped, so that the current which charges the battery pack 161 from the power line may be cut off.

Accordingly, if an abnormality occurs in the battery pack 161 or each cell 1610 included in the battery pack 161, even though the current which flows in the power line cannot be cut off by the master BMS 163, the battery may be safely managed by the slave BMS 162.

Figure 4:
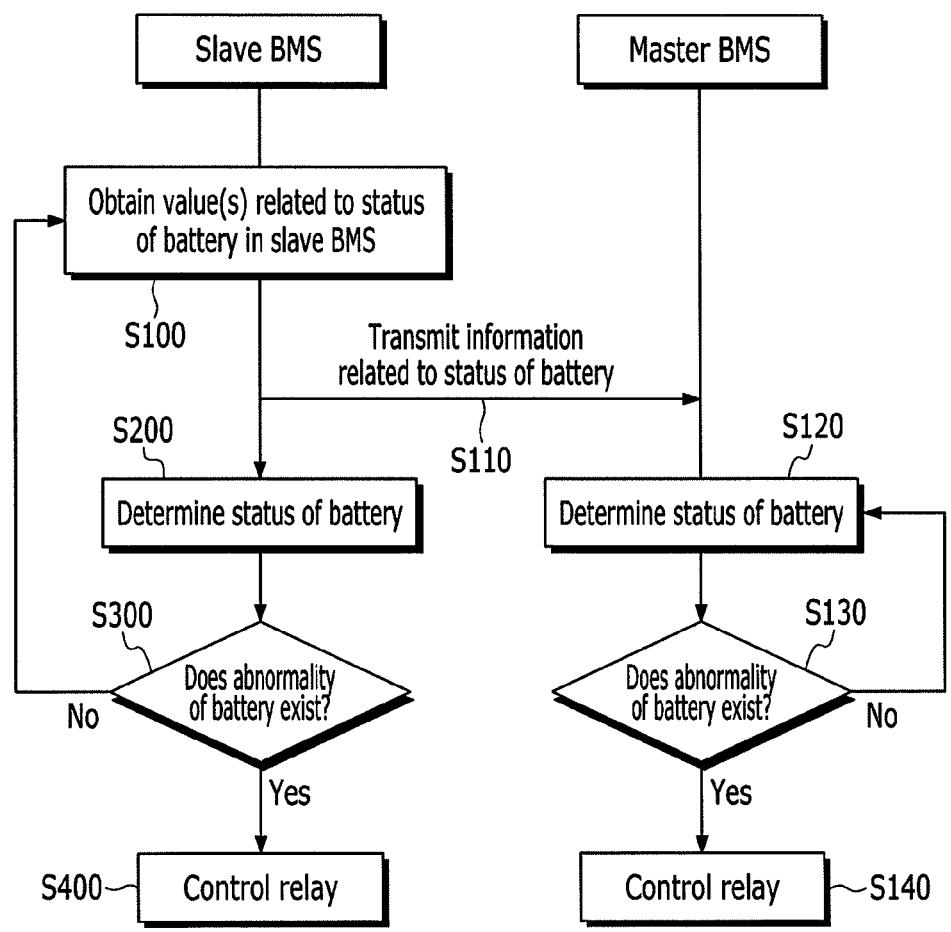
FIG. 4 illustrates an embodiment of a method for driving a battery management system.

FIG. 4 illustrates an embodiment of a driving method of a battery management system. As illustrated in FIG. 4, in step S100, the slave BMS 162 measures one or more values related to a state of the battery pack 161. The sensing unit 1620 of the slave BMS 162 may measure, for example, a voltage, a current, and/or a temperature of the battery pack 161.

In step S110, the slave BMS 162 transmits information on the status of the battery pack 161 to the master BMS 163. For example, the communication unit 1622 of the slave BMS 162 may convert the information on the status of the battery pack 161 into a CAN communication format signal in accordance with control of the control unit 1624, and output the converted signal to the master BMS 163.

In operation S120, the control unit 1624 of the master BMS 163 uses the information on the status of the battery pack 161, which is output from the slave BMS 162, to determine a status of the battery pack 161. If it is determined that an abnormality exists in the battery pack 161 in operation S130, the master control unit 1634 of the master BMS 163 controls the relay S10 in operation S140. If the battery pack 161 is overcharged or overheated, the master control unit 1634 may stop applying a current to the lead line S12 connected to the relay S10, through the master switch unit 1636. By doing this, the operation of the relay S10 stops so that the current which flows in the power line connected to the battery pack 161 may be cut off.

When an abnormality exists in the battery pack 161 and the master BMS 163 cannot control the relay S10 due to an error, the slave BMS 162 may control the relay S10 independently from the master BMS 163. The control of the relay S10 by the slave BMS 162 may be continuously or simultaneously performed with the control of the relay S10 by the master BMS 163.

In operation S200, the control unit 1624 of the slave BMS 162 determines a status of the battery pack 161 using the information on the status of the battery pack 161. If it is determined that an abnormality exists in the battery pack 161 in operation 5300, the control unit 1624 of the slave BMS 162 controls the relay S10 in operation S400. If the battery pack 161 is overcharged or overheated, the slave BMS 162 cuts off the current which flows in the lead line S12 connected to the relay S10 to stop the operation of the relay S10, to thereby cut off the current which flows in the power line connected to the battery pack 161.

In accordance with one or more of the aforementioned embodiments, a battery management system and method is provided which safely and effectively manages a battery for storing energy, for example, derived from a renewable energy source. Further, a battery management system and method is provided which may protect the battery even when an abnormality exists in a master battery management system.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A system, comprising:
   a first switch coupled to a charging and discharging path of a battery pack, the battery pack including at least one battery cell;
   a master battery management system (BMS) electrically coupled to the first switch to control operation of the first switch; and
   a slave BMS to obtain information of the battery pack and determine a status of the battery pack based on the information, wherein the master BMS is to control operation of the first switch based on the status of the battery pack and wherein the slave BMS is to control operation of the first switch based on an error condition of the master BMS.

2. The system as claimed in claim 1, wherein:
the first switch includes a relay coupled to the charging and discharging path and a coil to drive the relay in accordance with a current applied from the master BMS.

3. The system as claimed in claim 2, wherein:
the slave BMS controls operation of a second switch coupled to a first path where the current is applied to the relay.

4. The system as claimed in claim 3, wherein: the second switch includes a sub-relay coupled to the first path and a sub-coil to drive the sub-relay in accordance with the current applied from the slave BMS.

5. The system as claimed in claim 4, wherein:
if an abnormality exists in the battery pack, the slave BMS reduces the current applied to the sub-coil to open the sub-relay.

6. The system as claimed in claim 1, wherein the information of the battery pack includes at least one of a voltage value of the at least one battery cell, a current value which flows in the at least one battery cell, or a temperature value of the at least one battery cell.

7. The system as claimed in claim 6, wherein:
if any one of the voltage value, the current value, or the temperature value is out of a predetermined range, the slave BMS opens the first switch.

8. A system, comprising:
a master battery management system (BMS) coupled to a plurality of battery packs;
a plurality of slave BMSs coupled to respective ones of the plurality of battery packs, wherein:
the master BMS controls charging or discharging of the battery packs under a first condition, and
at least one slave BMS controls charging or discharging of one or more of the battery packs under a second condition different from the first condition, wherein the second condition is an error condition of the master BMS.

9. The system as claimed in claim 8, wherein the master BMS and the slave BMSs are powered independently from charge stored in the battery packs.

10. The system as claimed in claim 8, wherein the at least one slave BMS terminates the charging or discharging of one or more battery packs when the one or more battery packs is operating in an abnormal state.

11. The system as claimed in claim 10, wherein the abnormal state corresponds to when a parameter of the one or more battery packs lies outside a predetermined range.

12. A method of managing a battery, the method comprising:
measuring information of a battery pack which includes at least one battery cell;
transmitting the measured information to a master battery management system (BMS) which generates a signal to control operation of the battery pack;
determining a status of the battery pack based on the information; and
controlling operation of the first switch which is coupled to a charging and discharging path of the battery pack and which is electrically connected to the master BMS, wherein controlling operation of the first switch is performed based on the status of the battery pack, the method further including controlling operation of the first switch by a slave BMS when an abnormality exists corresponding to the master BMS.

13. The method as claimed in claim 12, wherein:
the first switch includes a relay coupled to the charging and discharging path and a coil to drive the relay in accordance with a current applied from the master BMS, the method further comprising:
controlling operation of a second switch coupled to a first path in which the current is applied from the master BMS to drive the relay.

14. The method as claimed in claim 13, wherein:
a second switch includes a sub-relay coupled to the first path and a sub-coil to drive the sub-relay, the method further comprising:
controlling an amount of current applied to the sub-coil based on the status of the battery pack.

15. The method as claimed in claim 14, further comprising:
when an abnormality exists in the battery pack, reducing an amount of current applied to the sub-coil to open the sub-relay.

16. The method as claimed in claim 12, wherein the information of the battery pack includes at least one of a voltage value of the at least one battery cell, a current value which flows in the at least one battery cell, or a temperature value of the at least one battery cell.

17. The method as claimed in claim 16, further comprising:
opening the first switch when any one of the voltage value, the current value, and the temperature value is out of a predetermined range.

* * * * *